United States Patent [19]
Lee et al.

[11] Patent Number: 5,949,980
[45] Date of Patent: *Sep. 7, 1999

[54] BUS INTERFACE UNIT FOR PREVENTING DEADLOCK

[75] Inventors: Suk Joong Lee; Han Heung Kim, both of Kyoungkido, Rep. of Korea

[73] Assignee: Hyundai Electronics Industries Co., Ltd., Kyoungkido, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/773,562

[22] Filed: Dec. 27, 1996

[30] Foreign Application Priority Data

Dec. 29, 1995 [KR] Rep. of Korea ............ 95-64423

[51] Int. Cl.[6] ............................................. G06F 13/14
[52] U.S. Cl. .................... 395/292; 395/287; 395/859; 395/860; 395/728; 395/732
[58] Field of Search ..................... 395/292, 293, 395/287, 296, 303, 859, 860, 861, 868, 871, 728, 729, 732

[56] References Cited

U.S. PATENT DOCUMENTS

| | | | |
|---|---|---|---|
| 3,866,181 | 2/1975 | Gayman et al. | 340/172.5 |
| 4,409,656 | 10/1983 | Andersen et al. | 395/200.8 |
| 4,667,305 | 5/1987 | Dill et al. | 395/307 |
| 5,182,808 | 1/1993 | Bagnoli et al. | |
| 5,201,043 | 4/1993 | Crawford et al. | 395/575 |
| 5,265,235 | 11/1993 | Sindhu et al. | 711/120 |
| 5,434,872 | 7/1995 | Petersen et al. | 711/154 |
| 5,542,079 | 7/1996 | Hatakeyama | 395/800 |
| 5,544,332 | 8/1996 | Chen . | |

*Primary Examiner*—Ayaz R. Sheikh
*Assistant Examiner*—Ario Etienne
*Attorney, Agent, or Firm*—Jacobson, Price, Holman & Stern, PLLC

[57] ABSTRACT

A bus interface unit has an arbitrating unit, in response to cycle requests received from internal devices of a processor and a resumption request, for determining an internal device having the highest priority and generating a cycle acknowledgment signal representing thereof; a queue input multiplexing unit, in response to the cycle acknowledgment signal, for selecting cycle queue data from the determined internal device to generate selected cycle queue data; a cycle queue storing unit for storing the selected cycle queue data and state information under; and a queue controlling unit for controlling the cycle queue storing unit to store the selected cycle queue data and the state information under the condition that a back-off condition occurs, and for resuming a cycle under the condition that the back-off condition is cleared by using the stored selected cycle queue data based on the state information to provide the resumption request to the arbitrating unit.

9 Claims, 3 Drawing Sheets

1

BUS INTERFACE UNIT FOR PREVENTING DEADLOCK

BACKGROUND OF THE INVENTION

The present invention relates to a bus interface unit having a cycle queue for preventing deadlock, for performing interfacing operation between an external chip set and internal units in a microprocessor.

A bus interface unit generally carries out an arbitration, that is, the bus interface unit receives requests for a bus cycle from respective units of a processor core and transmits the received requests to the outside thereof. In some events, an external system may request to suspend the cycle in process or request to resume the cycle. In such a case, the bus interface unit allows the cycle to be suspended or resumed in an efficient way.

Also, in order to overcome the deadlock frequently occurring in the case of the presence of several masters, a kind of a backoff function must be supported. The system equipped with the backoff function can assure the suspension and resumption of the cycle in process.

Here, the deadlock is generated when several units desire shared resources owned by the units different from one another, but any unit does not back off its own shared resource. In such a condition, no operation occurs.

In order to overcome the deadlock condition, one of the units backs off and hands over the shared resources owned by itself to another unit, so that it can complete its own task using the shared resources released by the unit having taken over the shared resources after completing a task using the shared resources.

The system having several masters compulsorily requires the backoff function for preventing the probable deadlock. Also, it is necessary to allow the backoff unit to resume the suspended cycle in an effective manner.

SUMMARY OF THE INVENTION

To solve the problems of the conventional art, it is an object of the present invention to provide a bus interface unit for preventing deadlock which can attain a precise operation by processing a backoff function naturally in a system with various bus masters, particularly, a multiprocessor in which the backoff function is very important, and can improve efficiency of resources by utilizing a cycle queue as both backoff storing unit and normal cycle executing unit and by processing even misaligned cycles.

To accomplish the above object, there is provided a bus interface unit comprising: arbitrating unit for arbitrating a cycle request received from the bus interface unit to allow a device having the highest priority to process the cycle; queue input multiplexing unit for selecting a cycle in a cycle queue according to a cycle acknowledge signal received from the arbitrating unit; misaligned cycle checking unit for checking whether a cycle to be proceeded from the queue input multiplexing unit is aligned with respect to a data bus; queue controlling unit for storing a new cycle in the cycle queue for the control of the cycle queue, resuming the cycle if a backoff condition is cleared and vacating the cycle queue; and a cycle queue receiving a new cycle from the queue input multiplexing unit or the checking unit for a misaligned cycle to then be stored according to a signal of the queue controlling unit and erasing a queue whose cycle processing is completed.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinbelow, an embodiment of the present invention will be described in detail with reference to accompanying drawings.

Figure 1:
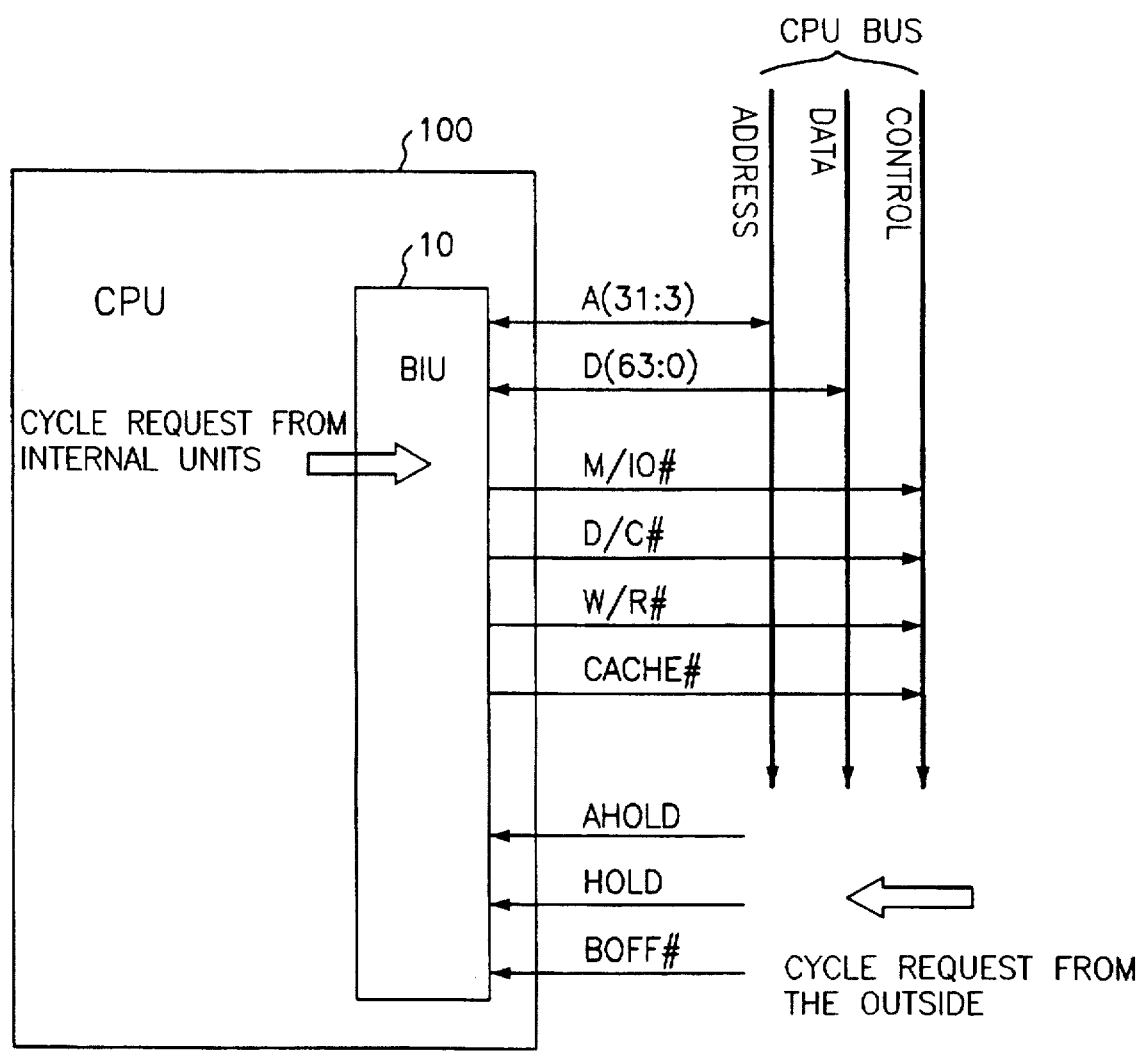
FIG. 1 is a schematic diagram of a bus interface unit for a pentium processor.

FIG. 1 briefly shows a bus interface unit for a pentium processor, showing, although there are many pins in practice, only pins denoting types of cycles during processing of a cycle to the outside via the bus interface unit and pins used for an external unit to request bus suspension to the pentium processor.

Figure 2:
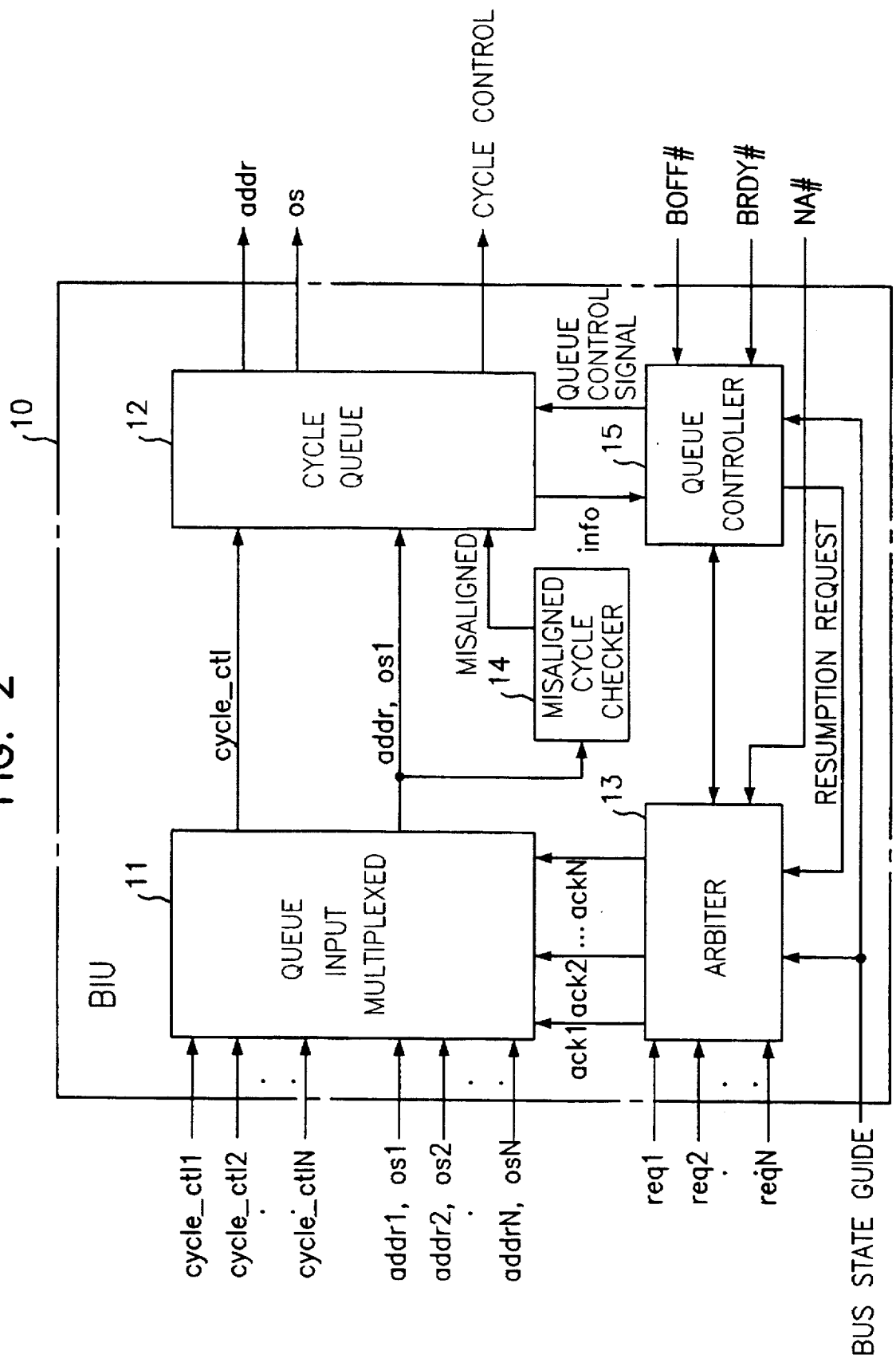
FIG. 2 is a detailed block diagram of a unit related to a cycle queue in bus interface unit.

FIG. 2 shows only important portions related to a cycle queue in the bus interface unit, although more than are shown therein are related to the cycle queue in practice.

Figure 3:
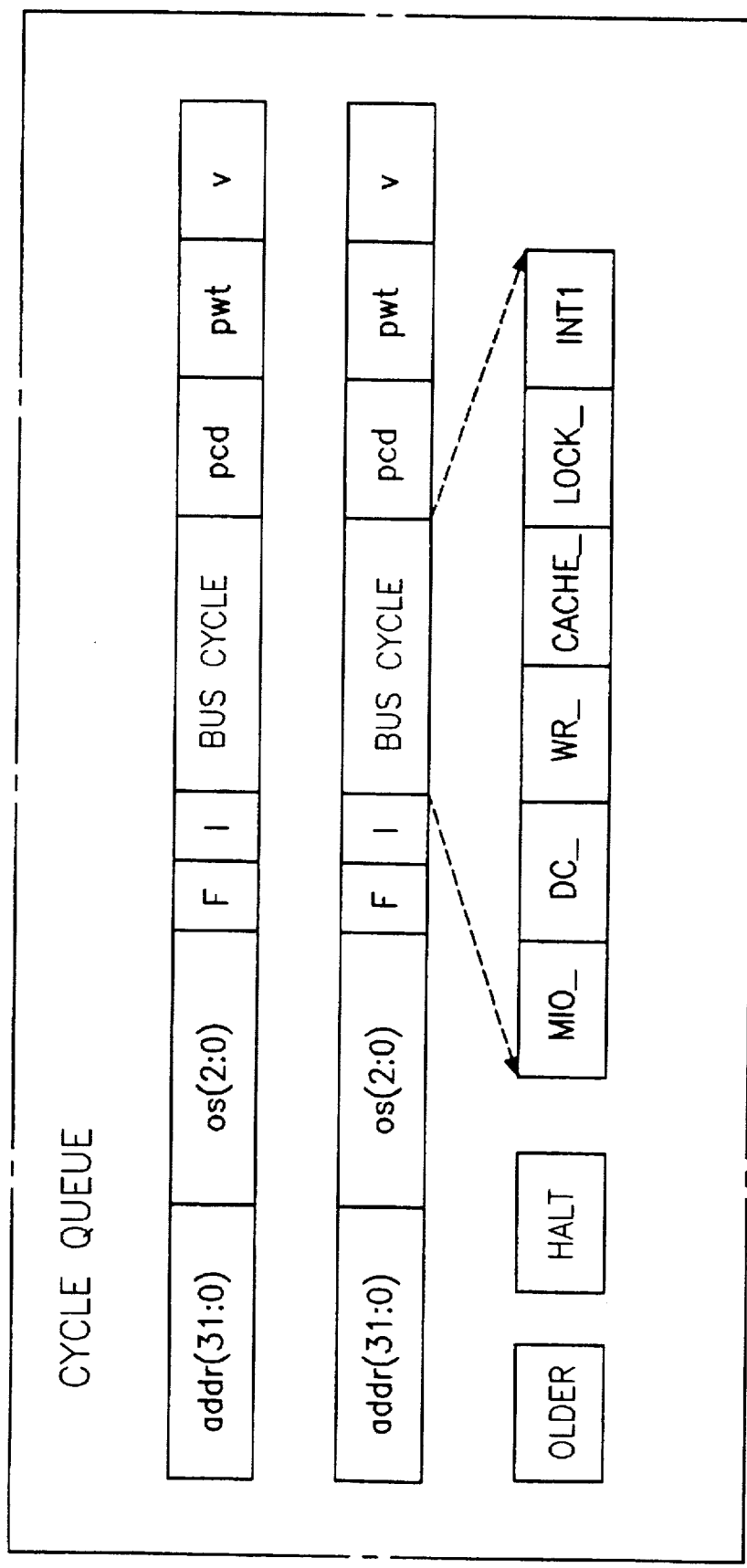
FIG. 3 illustrates various parts of the cycle queue shown in FIG. 2.

FIG. 3 shows various parts of an actual cycle queue.

In the case of a pentium processor, there is provided a pin named BOFF# for supporting a backoff function. When the pin enters into an active state, the cycle being in process is suspended, and the suspended cycle is resumed when the pin enters into an inactive state.

The bus cycle for the pentium processor greatly differs from that for a 486-capacity processor in that up to two cycles are allowed in the pentium processor whereas only one bus cycle could be proceeded in the 486-capacity processor. Also, If an external chip set transmits the BOFF# signal as a driving suspend signal for a CPU bus, the cycle is resumed from the point of its suspension in the 486-capacity processor. However, in the case of the pentium processor, the suspended cycle is resumed from the beginning.

Therefore, the present invention is contrived as means for allowing suspension of maximum allowable two cycles being in process and assured resumption the suspended cycles. The queue according to the present invention is comprised of two entries for storing information for two bus cycles.

A request signal for bus cycle processing is received to each internal unit of the processor, and the information having the highest priority is first stored in the cycle queue. The cycle queue includes various parts for storing information related to the cycle, which is necessary for resumption of the cycle. If the cycle is suspended by a backoff request, the cycle information is retained as it is and then the cycle queue takes responsibility of re-processing of the bus cycle if the backoff condition is cleared.

In addition to such basic functions, the cycle queue further has a function for processing the boundary data bus.

The bus interface unit generally carries out arbitration, that is, it receives a request for the bus cycle from the respective units of the processor core and transmits the received request to the outside, or it transfers various requests from the outside to the CPU.

FIG. 1 is a schematic conceptual diagram of a bus interface unit (BIU) for a pentium processor adopted in the present invention. In the case of a pentium processor, the cycles requested from the core thereof includes read and write cycle of data or codes from/to a memory, read and write cycle from/to an I/O device, an interrupt acknowledge cycle for obtaining an interrupt vector against an external interrupt and a special cycle for signaling that the current processor is executing a specific instruction or is in a specific state. In order to indicate the kinds of the cycles, the pentium processor adopts the corresponding pins, that is, M/IO#, D/C#, W/R# and CACHE#.

The requests from the external unit to the processor includes three kinds-AHOLD, HOLD and BOFF#.

First, by using the AHOLD pin, only an address bus of the processor is floated for a snoop cycle for checking whether there is a particular cache line in the internal cache. Then, an external chip set drives the address bus. Second, the HOLD pin indicates that the suspension of the processor driving the CPU bus is requested so as for the external chip set to use the CPU bus, and the CPU bus is floated if the currently processed cycle is completed. Third, the BOFF# pin is the same as the HOLD pin in that the CPU bus is floated. However, this pin has a powerful function of floating the bus in the immediately next clock, that is, requesting a backoff, while even the cycle being currently in process is suspended.

In the case of the pentium processor, since the maximum allowable two cycles is processed, the maximum two cycles in process may be suspended under the backoff condition. The thus suspended cycles must be resumed when the backoff condition is cleared. For this purpose, during the backoff state, every bus interface unit requesting the cycle keeps the suspension of the cycle in the memory and then requests the resumption of the cycle again. Alternatively, the bus interface unit retains the information on the suspended cycle and then resumes the cycle.

The present invention takes the latter resumption method. As in the former method, in order to alleviate the burden of every unit storing the suspended cycle by the backoff, there is provided in the bus interface unit a cycle queue serving as a latch for a bus cycle.

Basically, the cycle queue is for resuming the suspended cycle during the backoff. In a normal cycle not in the backoff state, the cycle queue is also used as a temporary latch for signals for the address of the cycle in process, operand size (os) and kinds of the bus cycle. Since these signals must be kept as valid values while processing the bus cycle, it is preferred to store them in the latch and drive the same.

Also, the cycle queue may be used in processing the cycle in the boundary of data bus. In this case, one cycle is received and then two cycles are formed by the bus interface unit. To this end, it is necessary to store the information for the cycle directly before the current cycle. At this case, the cycle queue simply processes the storage of the information.

FIG. 2 is a detailed block diagram of the bus interface unit including the cycle queue according to the present invention.

First, an arbiter 13 for a cycle request arbitrates a cycle request received from the bus interface unit to allow a device having the highest priority to process the cycle.

A queue input multiplexer 11 selects to store a cycle in a cycle queue according to an acknowledge signal from the arbiter 13.

A misaligned cycle checker 14 for checking whether a to-be-processed cycle is aligned with respect to a data bus, receives information on lower bits of an input address and operand size to check the probability of processing the cycle in one cycle period. In other words, in the case of the pentium processor, since the width of the data bus is 64 bits, data of 8 bytes in total can be processed in a cycle. Here, the address of the least significant byte of the data bus is aligned as an 8 byte unit all the time. Therefore, even if the data to be processed actually is less than 8 bytes, the cycle may not be processed within one cycle period in some cases, according to a start address.

A queue controller 15 for controlling the cycle queue stores a new cycle in the cycle queue, controls a misaligned cycle, resumes the cycle when the backoff condition is cleared, or vacates the cycle queue.

A cycle queue 12 receives and stores a new cycle from the queue input multiplexer 11 or misaligned cycle checker 14 according to a signal of the queue controller 15, or erase the queue whose cycle processing is completed.

Upon a request for a cycle processing from various internal units of the processor, the unit having the highest priority is determined as one for processing the cycle by the arbiter 13. Then, the arbiter 13 transmits an acknowledge signal for granting the cycle processing. The signal is input to the queue input multiplexer 11 for determining the input of the queue and determines the address from the acknowledged unit, operand size and kinds of the bus cycle. Here, the lower bits of the address and operand size are used in determining the presence of the misaligned cycle to then be written in the queue.

The address stored in the queue becomes the one to be transferred externally. The portion indicating the operand size is used in forming BE|7:0|# which is a byte enable signal together with three lower bits of the start address. Also, the portion indicating the kinds of the cycle is used in controlling the cycle, and pad and pwt portions are used in controlling an external cache. F and I bits are used for the misaligned cycle.

FIG. 3 shows various parts of the cycle queue, which will be explained as follows.

older: This is a kind of a flag indicating an entry to be preferentially processed of two entries of the cycle queue, that is, the first used entry.

halt: This indicates that a cycle suspended by a backoff condition. If the backoff condition is cleared, the cycle stored in the cycle queue is preferentially processed in case when the bit for the halt is set.

address: The address of the cycle to be processed. The address actually transferred to the outside is 29 upper bits, but 32 bits are all stored for forming a byte enable signal.

os: The size of an operand of the cycle to be processed.

F: The first cycle of misaligned cycles. In the case of a pentium processor, since misaligned cycles are processed starting from the upper misaligned cycle, this portion is required. However, this portion is meaningless in the case of aligned cycles.

I: This portion indicates that the current cycle is a misaligned cycle in the bus interface unit boundary.

bus cycle: The kind of the cycle to be processed, composed of six bits in total.

pad and pwt: These portions control an external cache in the case of using the same.

v: This is a valid bit portion indicative of the presence of valid data in the cycle queue and is used for indicating the one to be preferentially processed of the two entries of the cycle queue. When only one bus cycle is processed, the valid bit portion indicates a queue in which the currently processed cycle is stored. When two cycles are processed in a bus cycle pipelining way, this portion is used for indicating the preferentially processed cycle.

Of the two queue entries, the preferentially used one is determined by a value of the older bit functioning as a flag using a shifter chain according to the position, without indicating a fixed sequence. In other words, assuming that these two queues are named as an F queue and an R queue, it is indicated that the F queue is the one preferentially used if the older value is 1, and the R queue is the one preferentially used if the older value is 0.

A new cycle is stored in the cycle queue 12 as follows. In other words, if a new cycle is initiated in a state where the queue is vacant, the information concerning the new cycle is written in the F queue, the older is made to indicate the F queue and the valid bit (v) of the F queue is set. If a new cycle is initiated in the bus cycle pipelining way in a state where one queue is replete, the new cycle is stored in the entry other than that indicated by the older, and the valid bit of the entry is set. When two entries are both replete, no more new cycle is received.

The completion of the cycle in process is controlled as follows.

First, if the cycles are stored in both entries, the valid bit of the entry indicated by the older is cleared. Then, the older is toggled to indicated that the entry other than the one whose cycle is completed becomes the cycle to be processed preferentially. If the cycle is stored in only one entry, the valid bit of the corresponding entry is cleared and the older is toggled. Here, the operation of toggling the older has no meaning, which, however, functions to facilitate actual implementation of a circuit.

If the backoff condition occurs during the cycle processing, the cycle in process is suspended and the halt bit is set. If the backoff condition is cleared, the halt bit is cleared after the cycles remaining in the cycle queue are all processed.

A new cycle must be processed in the cycle queue 12 in the following cases.

First, as described above, if the backoff condition occurs in the presence of the cycle in process, the halt bit is set to indicate that there is a suspended cycle. Then, the backoff condition is cleared, the queue controller 15 checks the halt bit and transmits a request signal to the arbiter 13 for a cycle request if the halt bit is set. The arbiter 13 preferentially processes the request from the cycle queue 12.

Next, the new cycle is processed in case when the cycle cannot be processed in a single cycle because of being caught in the data bus boundary. In other words, when F and I bits are set, which means that the currently processed cycle is the first cycle of the misaligned cycles, the queue controller 15 transmits a request signal for next cycle processing to the arbiter 13. Then, the arbiter 13 preferentially processes the request. The thus processed second cycle clears the F bit to indicate that the second cycle of the misaligned cycles is processed.

The present invention is applicable in the case of necessitating cycle suspension and resumption when a backoff condition is requested. In other words, the present invention is not limited to the case of the pentium processor but is applicable for a processor having a different structure from the pentium processor.

As described above, the present invention has the following advantages in that a precise operation can be attained by processing a backoff function naturally in a system with various bus masters, particularly, a multiprocessor in which the backoff function is very important, and efficiency of resources can be improved by utilizing a cycle queue as both backoff storing means and normal cycle executing means and by processing misaligned cycles.

What is claimed is:

1. A bus interface unit comprising:

arbitrating means, in response to cycle requests received from internal devices of a processor and a resumption request, for determining an internal device having the highest priority and generating a cycle acknowledgment signal representing the internal device having the highest priority;

queue input multiplexing means, in response to the cycle acknowledgment signal, for selecting cycle queue data from the determined internal device to generate selected cycle queue data;

cycle queue storing means, having state information, for storing the selected cycle queue data; and queue controlling means for controlling the cycle queue storing means wherein, under the condition that a back-off condition occurs, said queue controlling means updates the state information to a halt state if the stored selected cycle queue data is in process, and, under the condition that the back-off condition is cleared, for resuming a new cycle by using the stored selected cycle queue data based on the halt state to thereafter provide the resumption request to the arbitrating means.

2. A bus interface unit as claimed in claim 1, wherein the stored selected cycle queue data has at least two queue entries corresponding to the number of overall pipelines.

3. A bus interface unit as claimed in claim 2, wherein the cycle queue storing means further comprises a shift chain which is used for indicating the entry to be preferentially processed between said queue entries and updated by the queue controlling means.

4. A bus interface unit as claimed in claim 1, wherein the stored selected cycle queue data comprises a cycle address.

5. A bus interface unit as claimed in claim 1, wherein the stored selected cycle queue data has a portion for indicating the size of an operand experiencing actual transmission.

6. A bus interface unit as claimed in claim 5, wherein the stored selected cycle queue data has a portion for indicating the kind of a cycle in process.

7. A bus interface unit as claimed in claim 1, further comprising misaligned cycle checking means for checking whether the selected cycle queue data to be proceeded from the queue input multiplexing means is aligned with respect to a data bus.

8. A bus interface unit as claimed in claim 7, wherein the stored selected cycle queue data has a cycle address and an operand information representing the size of an operand experiencing actual transmission.

9. A bus interface unit as claimed in claim 8, wherein the misaligned cycle checking means checks the possibility of processing the selected cycle queue data in a predetermined cycle period by using lower bits of the cycle address and the operand information.

* * * * *